United States Patent [19]

Kirma

[11] Patent Number: 5,091,604
[45] Date of Patent: Feb. 25, 1992

[54] ARRANGEMENT FOR PROTECTION OF ELECTRICAL INSTALLATIONS AGAINST ELECTROMAGNETIC DISTURBANCES

[75] Inventor: Safa Kirma, Wedel, Fed. Rep. of Germany

[73] Assignee: Messerschmitt-Bölkow-Blohm GmbH, Ottobrunn, Fed. Rep. of Germany

[21] Appl. No.: 510,205

[22] Filed: Apr. 17, 1990

[30] Foreign Application Priority Data

May 6, 1989 [DE] Fed. Rep. of Germany ....... 3914931

[51] Int. Cl.$^5$ .................. H02G 13/00; H05K 9/00
[52] U.S. Cl. .................... 174/2; 174/35 C; 174/72 A; 174/35 SM
[58] Field of Search ............. 174/2, 6, 35 C, 35 SM, 174/36, 71 R, 72 R, 72 A, 78; 123/143 C, 633; 361/216, 218; 439/34, 502, 610, 623

[56] References Cited

FOREIGN PATENT DOCUMENTS 527641 10/1940 United Kingdom ............. 174/35 C
2080010 1/1982 United Kingdom .......... 174/35 SM Primary Examiner—Leo P. Picard
Assistant Examiner—Bot Ledynh
Attorney, Agent, or Firm—Toren, McGeady & Associates

[57] ABSTRACT

For purposes of protecting electrical installations against electromagnetic disturbances, especially overvoltages, for instance, as a consequence of lightning strikes, wiring lines laid for connecting individual electrical apparatus are surrounded by a shielding, which is formed by a braiding, consisting of electrically conducting material and which is in connection with connector elements arranged at its ends. The connector elements, as well as an additionally provided terminal, branching and attachment elements, comprise, respectively, a transitional part over which the braiding is pulled and on which it is fastened by means of a clamping element. In addition, further sheaths of a plastic braiding are provided between the electrical shielding and the electrical lines.

12 Claims, 4 Drawing Sheets

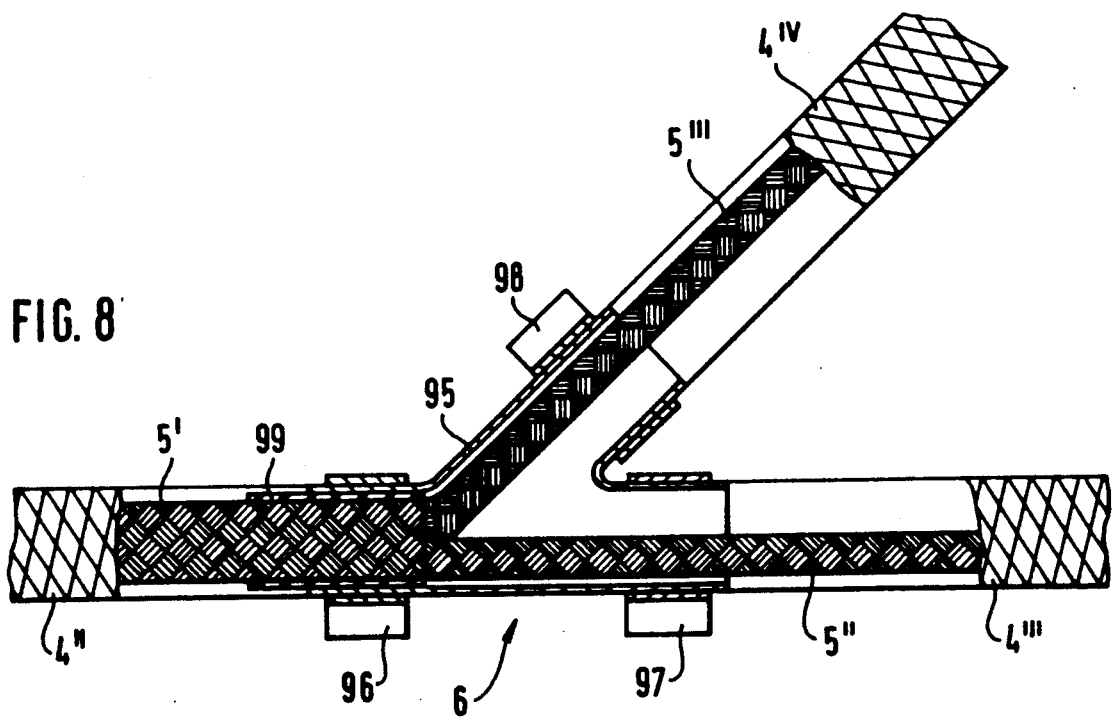

ARRANGEMENT FOR PROTECTION OF ELECTRICAL INSTALLATIONS AGAINST ELECTROMAGNETIC DISTURBANCES

The present invention is directed to an arrangement for protecting electrical installations against electromagnetic disturbances, especially against overvoltages and lightning strikes, and involve a braiding consisting of an electrically conducting material which embraces electrical wiring lines laid in bundles between individual electrical equipment and which is connected conductively by connector elements with charge eliminator points.

BACKGROUND OF THE INVENTION

Arrangements of this type are required especially in aircraft, where not only large quantities of electrical equipment with very different information signals and disturbance sensitivities are arranged in a relatively confined space, but also where the possibility of mutual interaction must be reliably eliminated. More specifically, such installations must safely resist the effects of lightning strikes, which otherwise greatly threaten electronic equipment of this kind.

Because of this, an already known method provides equipping electrical connecting cables in aircraft, especially complete cable harnesses, with shielding from metallic conducting material, and connecting the shielding, respectively, at its ends with the housings of the electrical devices or with especially provided leads to ground or equivalent reference potential, such as the aircraft fuselage. Generally, a hose-shaped braiding consisting of individual metal strands is utilized for this purpose which, in case of current carrying contact plugs, is connected with the metallic plug housing at the cable ends. Also, the connection of this braiding with provided charge elimination points frequently occurs by means of separate hose-type clamps which surround the braiding at the cable ends and from which a separate line, which is also designated as a "pig tail", is connected to the charge elimination point.

A disadvantage of these known shielding means is that the terminal and connector elements used therein are not only relatively costly in their fabrication and have a comparatively high inherent waste, but their installation as well, meaning the achievement of a mechanically and electrically satisfactory connection with the shielding braiding, requires a considerable expenditure of time.

SUMMARY OF INVENTION

Therefore, it is a principal object of the present invention to provide an arrangement of the previously named type in such a way that a considerable saving of waste, fabrication and stocking costs is made possible and that is easy to install.

This and other objects and advantages as will appear hereinafter are achieved, in accordance with one aspect of the invention, by providing at the harness connectors, terminals, branching or attachment elements, a transitional member configured such that the braiding may be pulled over it and fastened to it by a clamping member. Such transitional members are relatively inexpensive to fabricate, provide little waste, and are very easy to install. When installed, they provide a reliable mechanical and electrical connection between the braiding and the harness connector. In accordance with a further aspect of the invention, a plastic braiding is arranged between the outer plastic shielding braiding and the inner cable wiring which provides additional protection for the wiring against chafing or abrasion.

BRIEF DESCRIPTION OF DRAWINGS

Advantageous refinements of the installation of the invention which are aimed especially at an extensive simplification of fabrication and installation will be found in the detailed description that follows of a number of embodiments of the invention, taken in conjunction with the accompanying drawings, wherein:

FIGS. 2 to 8 show, partially in section, views of various terminal, connector, and branching elements in accordance with the invention for use with cables of the type shown in FIG. 1.

DETAILED DESCRIPTION OF PREFERRED EMBODIMENTS

Figure 1:
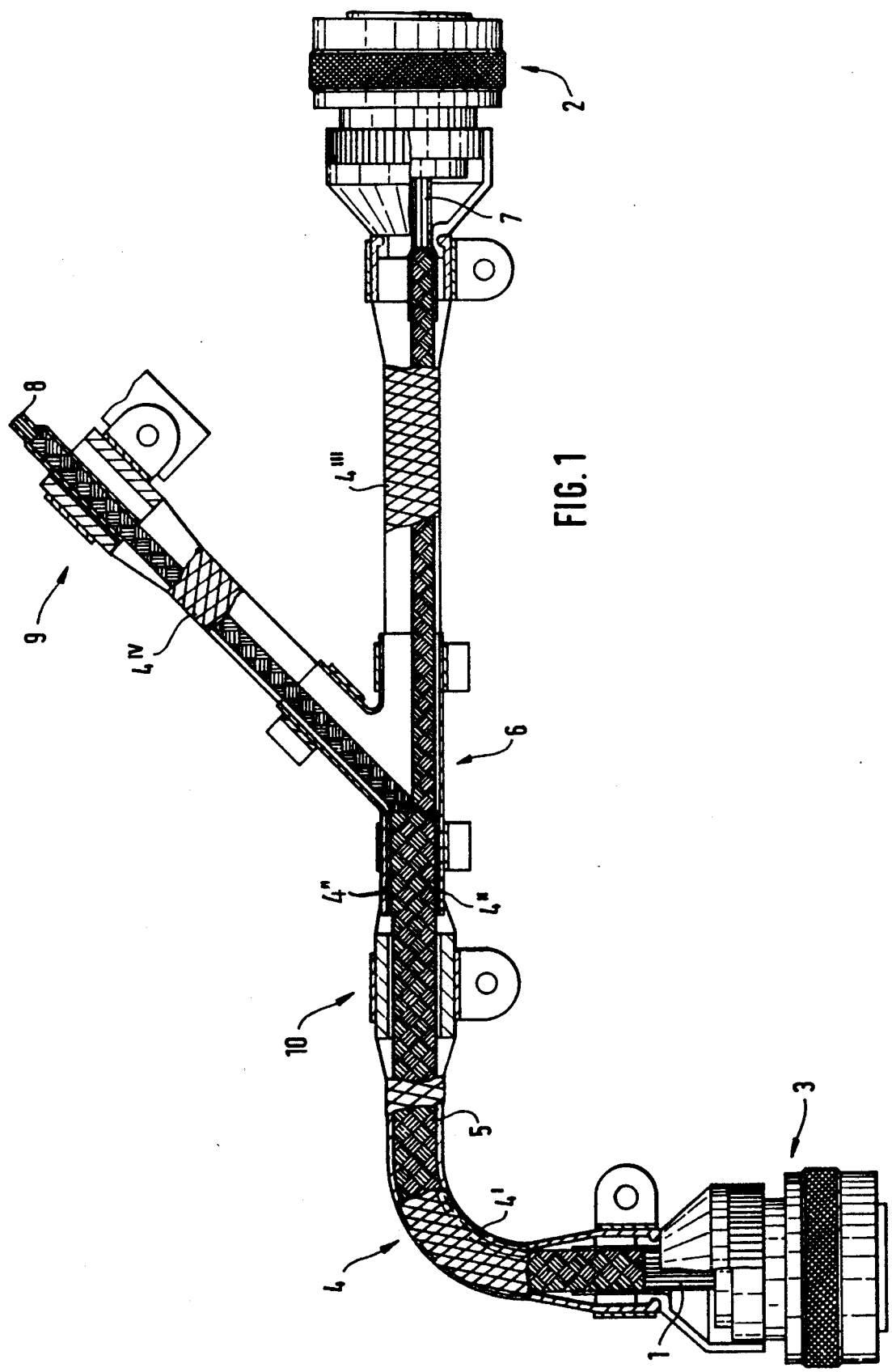
FIG. 1 is a side, partially cut-away and sectional view of a cable harness according to the invention involving a branched junction as well as various connector elements.

The compressed or shortened arrangement shown in FIG. 1 is a flexible cable harness 1, meaning a plurality of electrical connecting cables grouped into a bundle, which in the case of the example described here, can be laid inside an aircraft between components of various electrical equipment or apparatus not shown here. The junction of the cable harness 1 with these apparatus occurs respectively by means of multipin plug and socket connections by way of connector members or elements 2, 3 whose construction is described with particularity below.

In order to protect against electromagnetic interference, principally against overvoltages such as can arise especially as a consequence of a lightning strike, the cable harness 1 is covered by electrical shielding consisting of a flexible metal braid 4. In addition, a further hose-shaped sheath or jacket consisting of plastic braiding 5 is arranged between the cable harness and the metal braid 4 for protection against chafing, abrasion, or other mechanical stresses acting upon the cable harness 1. The cable harness 1 splits at a junction element 6 into two partial strands 7 and 8 extending separately, of which the extent of the cable runs 8 depicted at the top in the drawing is shown only up to a fastening member or element 9. Furthermore, in the arrangement depicted in FIG. 1, a connector member or element 10 additionally is provided which enables on the one hand a connection of two separate segments of the metal braiding and on the other hand an additional connection to a ground point arranged between the terminal elements 2 and 3. The metal braiding 4 serving by way of shielding consists in this case of a total of four partial segments, which are designated $4^I$ to $4^{IV}$.

Figure 2:
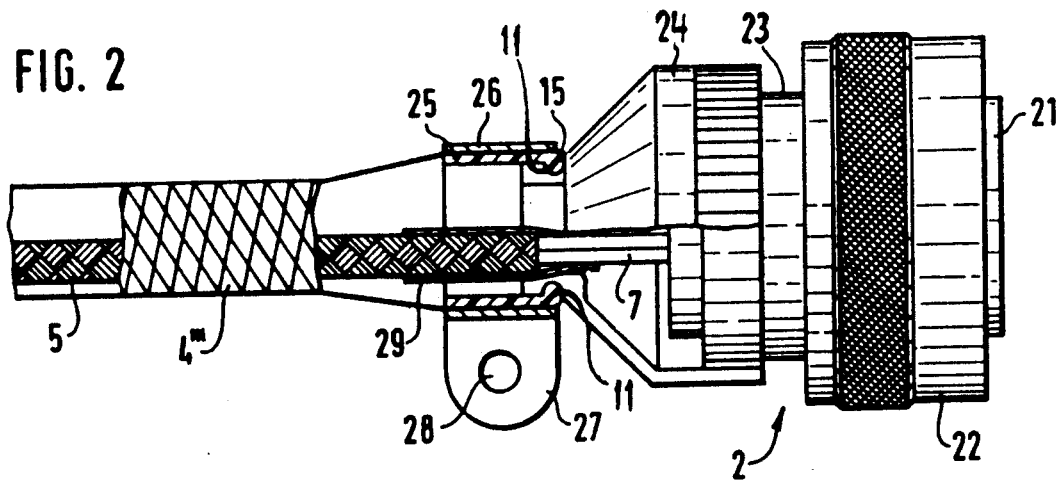

FIG. 2 is a magnification of the connector element 2 of FIG. 1. It comprises a multipin or multipole round plug-in connector 21 which is detachably connected with a socket and a device (not shown) by means of a bayonet or threaded latch 22. The housing 23 of this plug-in connector 21 is connected in a known manner with a cylindrical sleeve 25 so as to be able to rotate together with said housing by means of a conically tapering coupling ring nut 24; the sleeve 25, which constitutes the transitional member in this embodiment, consists of two half cylinders or shells in the version shown in FIG. 2. For this purpose, the sleeve 25 is provided with a bead 15 engaging into an annular groove 11 of the coupling ring nut 24. The widened end region of the metallic braid 4, in the case of the segment $4^{III}$, is pulled over this sleeve 25 and is fastened on same by means of a metallic clamp 26. The clamp 26 is provided with a sidewise lug or extension 27, where a throughbore 28 for a screw connection is arranged. Finally, a bushing 29 is provided inside the sleeve 25. The bushing 29 is pulled over the plastic braiding 5 and fixes the plastic braiding in the sleeve 25.

The achievement of a connection to a ground point, i.e., between the metal braiding 4 and the charge elimination point, can in this arrangement occur by screwing the connector clamp 26 to an appropriate line to ground. In this embodiment, it is possible to fabricate individual components of the connector element 2, for instance, the coupling ring nut, in addition to the sleeve, easily from plastic material for weight-saving. It is also possible to fabricate the connector element 2 completely of metal or an otherwise electrically conducting material, such as metallized plastic, in order to achieve an optimum shielding effect and to thus assure a continuous shielding up to the socket in the apparatus.

Figure 3:
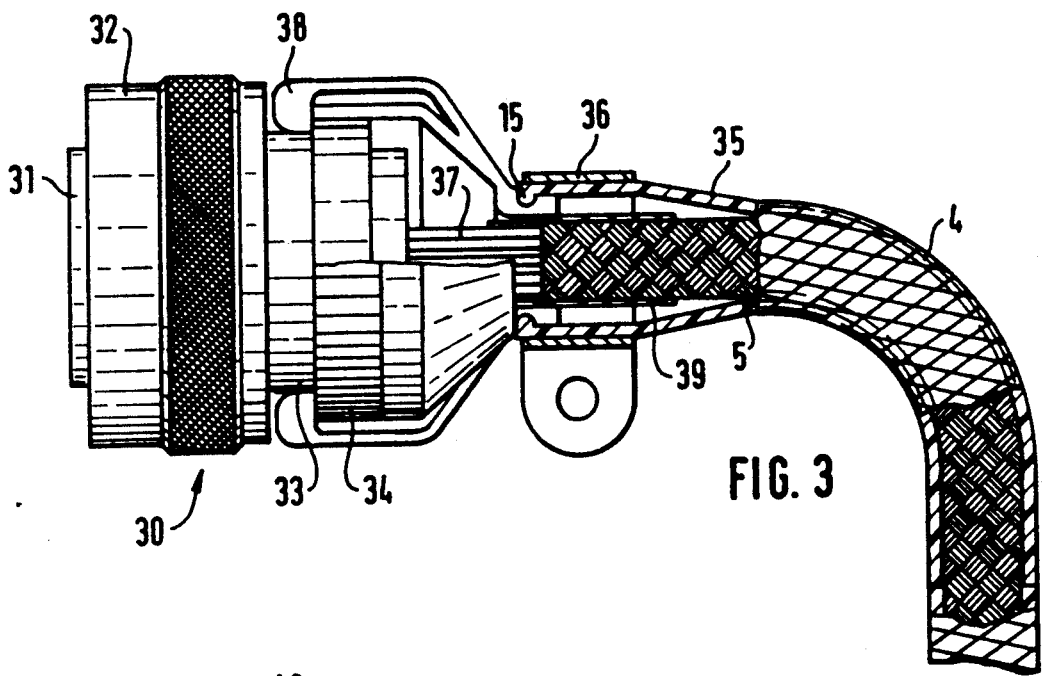

The connector or plug-in connection 30 depicted in FIG. 3 is essentially analogous to the previously described one, with a round plug-in connector 31, a locking latch 32, a housing 33, as well as a coupling ring nut 34. The coupling ring nut 34 is again retained with a cylindrical transition part as a support element 35 so as to rotate together with latter, which in this case is constructed as an elbow 35 and preferably consists of two half shells. The metal braiding 4 is pulled over this elbow and is fastened at its end (not shown in FIG. 3) again by means of an attachment clamp 36. The entering cable bundle 37 is embraced in this case also by a plastic braiding 5 and a bushing 39 is pulled over same as in FIG. 2. In this arrangement, two elastic securing hooks 38 molded to the conical region of the coupling ring nut 34 are additionally provided. These hooks 38 grip behind the thread arranged on the housing 33 when the coupling ring nut 34 is tightened, so that the coupling ring nut 34 cannot loosen of itself. The connector element 30 correspond to the connector element 3 in FIG. 1 with the exception of the safety or securing hook 38. The elbow 35, as shown, has a bead 15 securing it to the hook 38.

Figure 4:
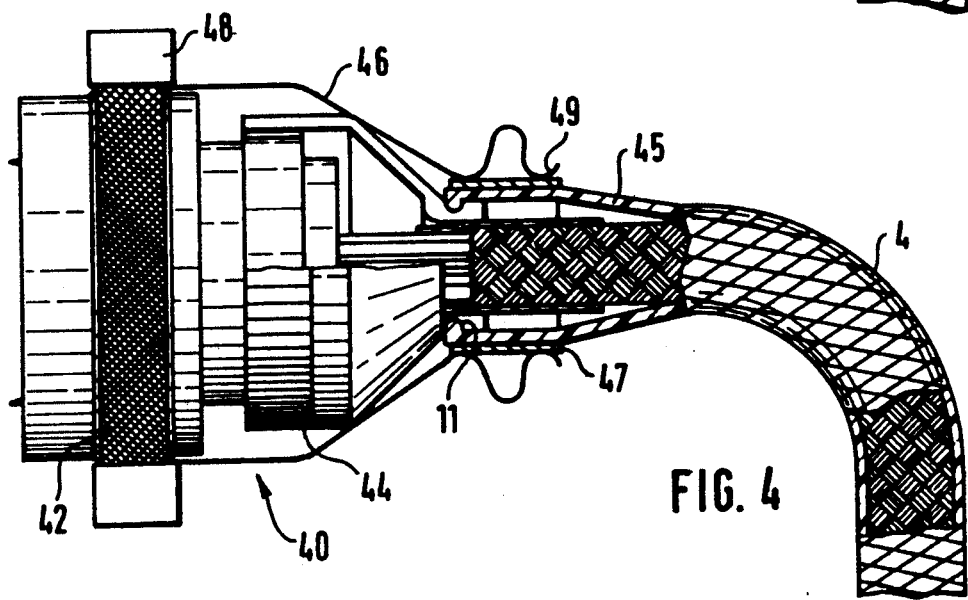

While in the previously explained connector element 30 the shielding is connected to ground by means of the connector clamp 36 upstream of the electrical equipment to be serviced, this measure is achieved for the connector element 40 depicted in FIG. 4 by means of a metallic hood 46. This hood 46 runs together with a squeezing or compression ring 47 over the end region of the metal braiding 4, which is also in this case again pulled over a transition element by means of a backup or support element 45. This element 45 is again designed as an elbow consisting of two shells and fabricated out of plastic material. The end of the hood 46 adjacent the socket in the equipment is fastened on a latching element 42 by means of a tool lug clamp 48. In this version, all the components of that connector element or plug-in element 40 can consist of an electrically non-conducting plastic material with the exception of the latching element 42, the hood 46 and squeezing ring 47, which are conductive and extend the braid shielding effect over the connector. The support element 45 engages a coupling nut 44 in the same manner as the support element 35 in the FIG. 3 embodiment engages the coupling 34.

The end of the hood 46 resting upon the squeezing ring 47 is provided with a row of longitudinal slots (not shown), whereby the external ends can act as contact springs 49.

Figure 5:
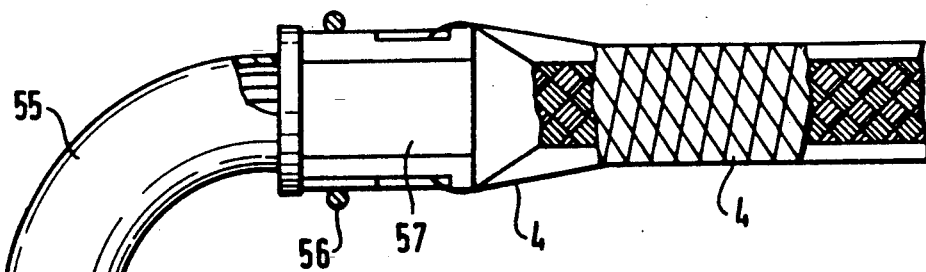

In the connector element 50 depicted in FIG. 5, an elbow 55 consisting of an electrically conducting material and formed out of two half shells is fastened by means of a coupling ring nut 54 at the housing 53 of the connector element 50. A transitional part by way of a support or backup element 57 follows upon the elbow 55. The support element 57, also consisting of an electrically conducting material, tapers conically on one side and over which is pulled the metal braiding 4. A shrinkage ring 56 serves in this case as a clamping element, which consists of so-called shape memory alloy. These are known materials which can be deformed but which remember their original shape when heated to a transitional temperature. Here, rotational mobility is provided between the housing 53 and the elbow 55

Figure 6:
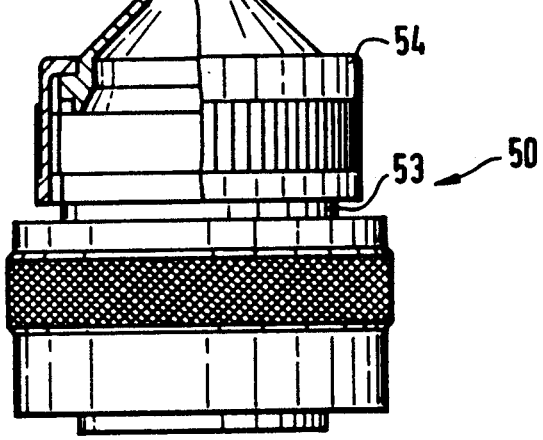
Figure 6:
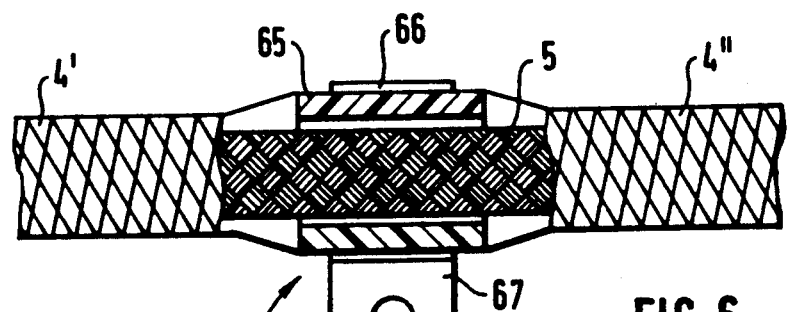

The drawing in FIG. 6 shows the partial region of the cable harness 1 where the connector element 10 in FIG. 1 is arranged, which connects the segments $4^I$ and $4^{II}$ of the metal braiding 4 with each other. This connector element 10 consists of a plastic sleeve 65, the end regions of which are pushed between the metal braiding 4 and the plastic braiding 5, respectively. The two segments $4^I$ and $4^{II}$ of the metal braiding 4 are pushed over the plastic sleeve 65 to such an extent that they practically touch each other. In this position both segments $4^I$ and $4^{II}$ are fastened by a connector clamp 66 slid over both which has a throughbore 68 in an extension 67. In this way an additional connection to ground of the shielding can occur simultaneously in the region of the connector element 10. If such a connection to ground is not required, a pinching or squeezing ring, two lug clamps or a similar element can be provided instead of a clamping connector 66 as a clamping element for the metal braiding 4 at this point.

Figure 7:
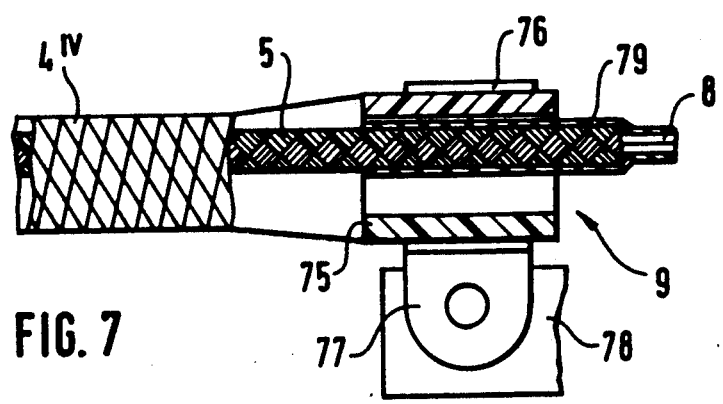

FIG. 7 shows a similar arrangement to FIG. 6, wherein an attachment element 9, arranged in the outer end region of the partial segment $4^{IV}$ of the metal braiding 4 in this case surrounds a branch 8 of the cable harness 1. This attachment element 9 consists of a plastic sleeve 75 tapering conically on one side, to which the end region of the metal braiding 4 is fastened again by a connector clamp 76. The extension 77 of the fastening clamp 76 is herein simultaneously connected with a metallic part 78 of the aircraft structure. The fiber ends of the plastic braiding 5 are fixed by means of a shrinkage tubing 79.

An electrical shielding for the branch element 6 is depicted in the arrangement in FIG. 8 which, in this case, consists of an electrically conducting housing 95 which can be constructed in one piece or in two pieces. In this branch element 6, the end region of each of the segments $4^{II}$, $4^{III}$ and $4^{IV}$ of the metallic shielding braid 4 is pulled over and fastened to the housing 95 by means of single lug clamps 96, 97, 98. The entering or arriving end $5^I$ of the plastic braiding 5 is in this case fastened to a bushing 99.

In the various embodiments shown, the transition members 25, 35, 45, and 55 act as a replaceable support or backup element for receiving an end region of the metallic braiding which is fastened to the transitional member by a clamp when a harness connector is attached. This affords an easy and inexpensive way of extending the electrical shielding to the connector. Preferably, plastic braiding 5 is provided between the metallic braiding and the cable conductors to protect the latter against damage when the harness is bent or otherwise handled during installation.

While specific embodiments of the invention have been shown and described in detail to illustrate the application of the inventive principles, it will be understood that the invention may be embodied otherwise without departing from such principles.

What is claimed is:

1. An electrical harness for interconnecting electrical apparatus for protecting same against electromagnetic disturbances due to overvoltages and lightning strikes, said harness comprising a plurality of electrical lines, an electrically conducting outer metallic braiding surrounding the electrical lines, a connector element connected to the electrical lines at the end of the harness, said connector element comprising a generally cylindrical transition member for receiving an end region of the metallic braiding, a clamping element for fastening the metallic braiding to the transition member, means for grounding the metallic braiding, and an inner plastic braiding surrounding the electrical lines inside of the metallic braiding for providing chafing protection between the electrical lines and the outer metallic braiding.

2. An electrical harness according to claim 1, wherein said inner plastic braiding embraces the electrical lines.

3. An electrical harness according to claim 1, wherein said connector element comprises half shells with said clamping element clamping the metallic braiding over the half shells.

4. An electrical harness according to claim 1, wherein the connector element further comprises a multiple round plug connector having a housing connected with the transition member in a rotationally mobile manner.

5. An electrical harness according to claim 4, wherein the transition member comprises a molded part surrounding the inner plastic braiding.

6. An electrical harness according to claim 4, wherein the connector element comprises a coupling ring nut of an electrically non-conductive plastic material.

7. An electrical harness according to claim 6, wherein the coupling ring nut has a conically tapering shape with an annular groove, the cylindrical member is a sleeve surrounding the electrical lines and having an annular bead engaging said annular groove.

8. An electrical harness according to claim 1, wherein the cylindrical member is of a plastic material and whose end region facing the metal braiding tapers conically.

9. An electrical harness according to claim 1, wherein the clamping element comprises a squeezing ring or a shrinkage ring composed of a shape memory alloy.

10. An electrical harness according to claim 1, further comprising a continuous hood, a clamp electrically connecting one end of the hood to the connector element, said hood comprising contact springs which clamp the clamping element for fastening the outer metallic braiding to the transition member with prestress.

11. An electrical harness according to claim 1, further comprising a branching element, said transition member being located at the branching element and comprising two half shells.

12. An electrical harness according to claim 1, wherein the transition member comprises two half shells.

* * * * *